US012780346B2

(12) United States Patent
Hsu

(10) Patent No.: US 12,780,346 B2
(45) Date of Patent: Nov. 3, 2026

(54) SMALL ELECTRIC SCOOTER

(71) Applicant: Haoting Hsu, Taipei (TW)

(72) Inventor: Haoting Hsu, Taipei (TW)

( * ) Notice: Subject to any disclaimer, the term of this patent is extended or adjusted under 35 U.S.C. 154(b) by 346 days.

(21) Appl. No.: 18/409,766

(22) Filed: Jan. 10, 2024

(65) Prior Publication Data

US 2025/0019027 A1 Jan. 16, 2025

(30) Foreign Application Priority Data

Jul. 13, 2023 (TW) ................................ 112126150
Jul. 13, 2023 (TW) ................................ 112207307

(51) Int. Cl.

| | |
|---|---|
| ***B62K 11/02*** | (2006.01) |
| ***B60Q 1/30*** | (2006.01) |
| ***B62J 1/08*** | (2006.01) |
| ***B62J 6/04*** | (2020.01) |
| ***B62J 43/16*** | (2020.01) |
| ***B62K 11/14*** | (2006.01) |
| ***B62K 25/04*** | (2006.01) |

(52) U.S. Cl.

CPC ................ *B62K 11/02* (2013.01); *B60Q 1/30* (2013.01); *B62J 1/08* (2013.01); *B62J 6/04* (2013.01); *B62J 43/16* (2020.02); *B62K 11/14* (2013.01); *B62K 25/04* (2013.01); *B62K 2202/00* (2013.01)

(58) Field of Classification Search

CPC ....... B60Q 1/30; B62J 1/08; B62J 6/04; B62J 25/04; B62J 43/16; B62K 3/002; B62K 11/02; B62K 11/14; B62K 25/04; B62K 2202/00; B62K 2204/00

USPC ........................................................ 280/283

See application file for complete search history.

(56) References Cited

U.S. PATENT DOCUMENTS

2013/0048401 A1* 2/2013 Kim ........................ B62J 43/28
280/638

FOREIGN PATENT DOCUMENTS

CN 102285414 A * 12/2011 ............ B62K 3/002

* cited by examiner

*Primary Examiner* — Valentin Neacsu
*Assistant Examiner* — Felicia L. Brittman-Alabi
(74) *Attorney, Agent, or Firm* — Che-Yang Chen

(57) ABSTRACT

The present invention provides a small electric scooter, including: a small electric vehicle body with a rectangular frame, at least one mobile power socket, a pair of foldable front and rear wheels, a seat set, a pair of handlebars, and a pair of front pedals and a pair of rear pedals. The mobile power socket, the front and rear wheels, the seat set, the handlebars and the front and rear pedals can all be unfolded or folded in the rectangular frame. Therefore, the front and rear wheels, the seat set, the handlebars, and the front and rear pedals are unfolded to form a small electric scooter that can travel, and folded to form a cuboid structure, which can be placed in the storage space in the hood of an electric vehicle or moved through the small wheels on the bottom two sides of the rectangular frame.

6 Claims, 5 Drawing Sheets

SMALL ELECTRIC SCOOTER

BACKGROUND OF THE PRESENT INVENTION

Field of Invention

The present invention relates to a technology for a small electric scooter, in particular to the small electric scooter that can be placed in a storage space inside the engine hood of an electric vehicle as a means of transportation, and used in conjunction with the electric vehicle to enhance the overall practicality and convenience.

Description of Related Arts

In recent years, electric cars have gradually entered the mainstream market. Although not most consumers will purchase electric cars, purchasing electric cars has become a new choice for many consumers. Under the hood of electric cars, the internal combustion engine is missing, and the front trunk is replaced, which means that there is an extra space under the hood to use.

However, the small space under the hood of common electric cars is usually used to set up the trunk or store some small items, and has no other purpose, so it feels that the front space of electric cars is not very practical.

Therefore, how to invent a small electric scooter can be set in the storage space in the hood of the electric vehicle, as a commuting or short-range mobile use, to improve the practicality of the front storage space of the electric vehicle, and improve the overall convenience, will be what the present invention wants to actively disclose.

SUMMARY OF THE PRESENT INVENTION

A object of the present invention is to provide a small electric scooter, mainly can be set in the storage space in the hood of an electric vehicle, with the function of an electric motorcycle, the overall volume is small, the appearance is simpler and neat, and can be folded for storage or folded for moving, in order to enhance the overall practicality and convenience.

In order to achieve the above purpose, the present invention provides a small electric scooter, which is allowed to be arranged in a storage space in a hood of an electric vehicle, including: a small electric vehicle body, at least one mobile power socket, a pair of foldable front wheel and rear wheel, a seat set, a pair of handlebars, and a pair of front pedals and a pair of rear pedals, the small electric vehicle body, which comprises a rectangular frame, a left outer plate and a right outer plate respectively provided on the left and right sides of the rectangular frame, a battery compartment provided on each of the two sides of the rectangular frame near the left outer plate and the right outer plate, and a battery placed in each of the battery compartments; at least one mobile power socket, installed in the rectangular frame and located in front of the battery compartment on one side thereof and electrically connected with the battery of the battery compartment for use as a mobile power supply; the pair of foldable front wheel and rear wheel, arranged in the rectangular frame at intervals front and rear respectively, wherein the front wheel and rear wheel are capable of extending downwards to the outside of the rectangular frame or being folded to the inside of the rectangular frame; the seat set, which comprises a liftable seat and a folding handle, wherein the seat is arranged in the rectangular frame near the rear and above the rear wheel, wherein the foldable handle is arranged adjacent to the bottom of the seat, wherein the rise and fall of the seat is capable of being controlled by pulling the foldable handle; the pair of handlebars, arranged in the rectangular frame near the front side, wherein the pair of handlebars are capable of being folded into the rectangular frame after being rotated and retracted inward; and the pair of front pedals and a pair of rear pedals, respectively arranged at the bottom of the rectangular frame, which are capable of being stretched out toward the outside and folded to the inside, wherein the front pedals and the rear pedals are folded and located under the front wheel and the rear wheel for locking the front wheel and the rear wheel.

According to a preferred embodiment, wherein the small electric scooter has a shock absorber arranged at each of the front side and the rear side of the rectangular frame, wherein the shock absorbers are arranged on the front side and the rear side of the rectangular frame close to the upper position, and are located below the seat set. The small electric scooter has a tailgate arranged on the rearmost side of the rectangular frame, wherein the tailgate has a rear lamp arranged thereon. The rectangular frame includes small wheels respectively provided on the bottommost two sides thereof. The left outer plate and the right outer plate, each have a hollow portion provided therefrom, which corresponds to the front pedals, for the front pedals to respectively unfold outside the left outer plate and the right outer plate. The pair of foldable front wheel and rear wheel, the seat set, the pair of handlebars, and the pair of front pedals and rear pedals are capable of being folded in the rectangular frame, respectively, and the small electric vehicle body forms a cuboid structure after being folded.

DETAILED DESCRIPTION OF THE PREFERRED EMBODIMENT

The implementation of the present invention is described below through specific examples, and those skilled in the art can easily understand other advantages and effects of the present invention from the content disclosed in this specification.

The following is a reference to the schematic view to illustrate the embodiments of the present invention. It should be noted that the following schematic view is a simplified schematic view and only provides a schematic explanation of the basic concept of the present invention. Therefore, the schematic view only illustrates the structure related to the present invention and is not drawn based on the actual number, shape, and size of the components at the time of implementation. The actual type, quantity, and proportion of each component at the time of implementation are not limited to the schematic view, and can be changed according to actual design needs.

Figure 1:
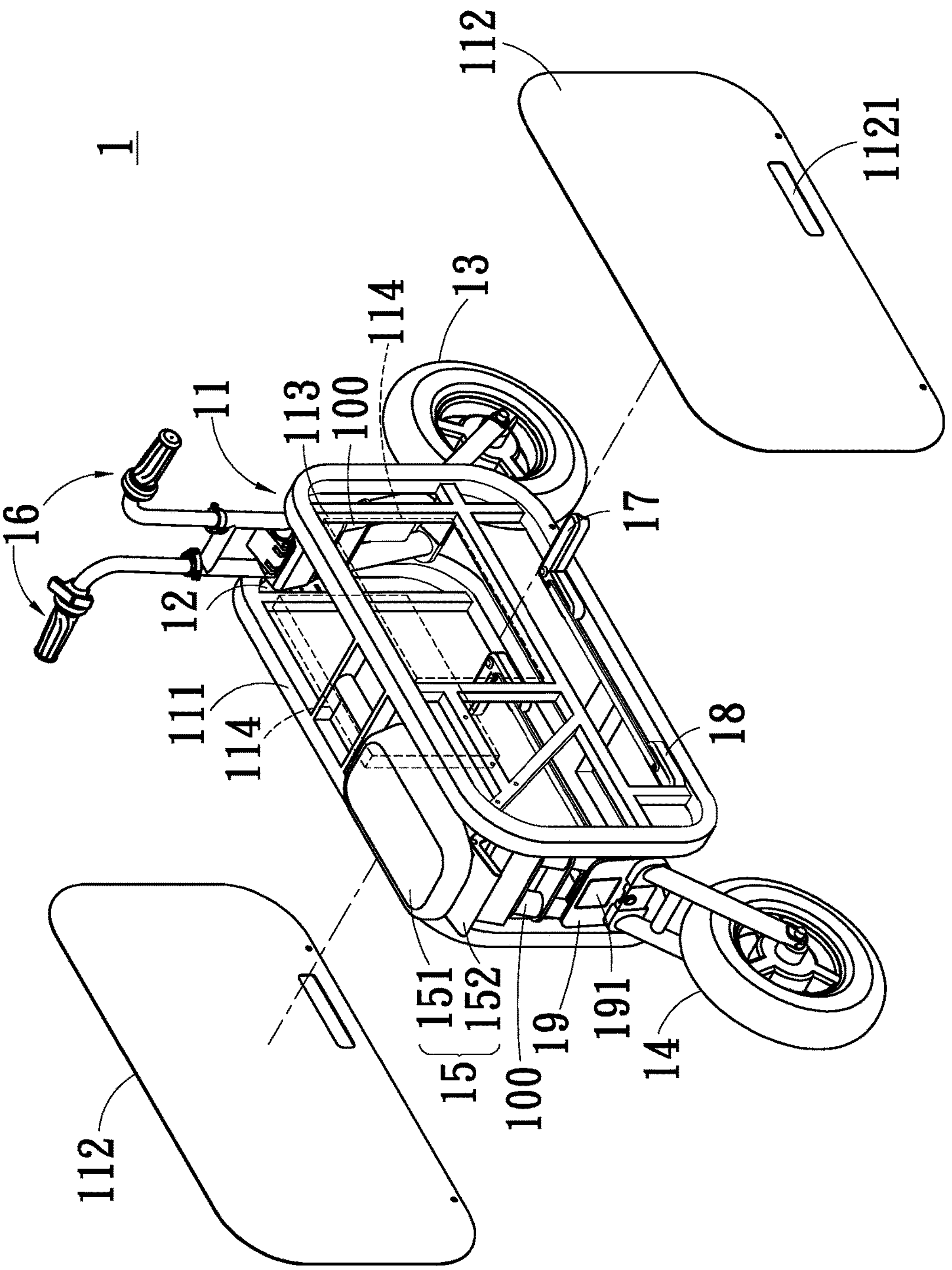
FIG. 1 is an exploded view of a preferred embodiment of a small electric scooter according to the present invention.
Figure 2:
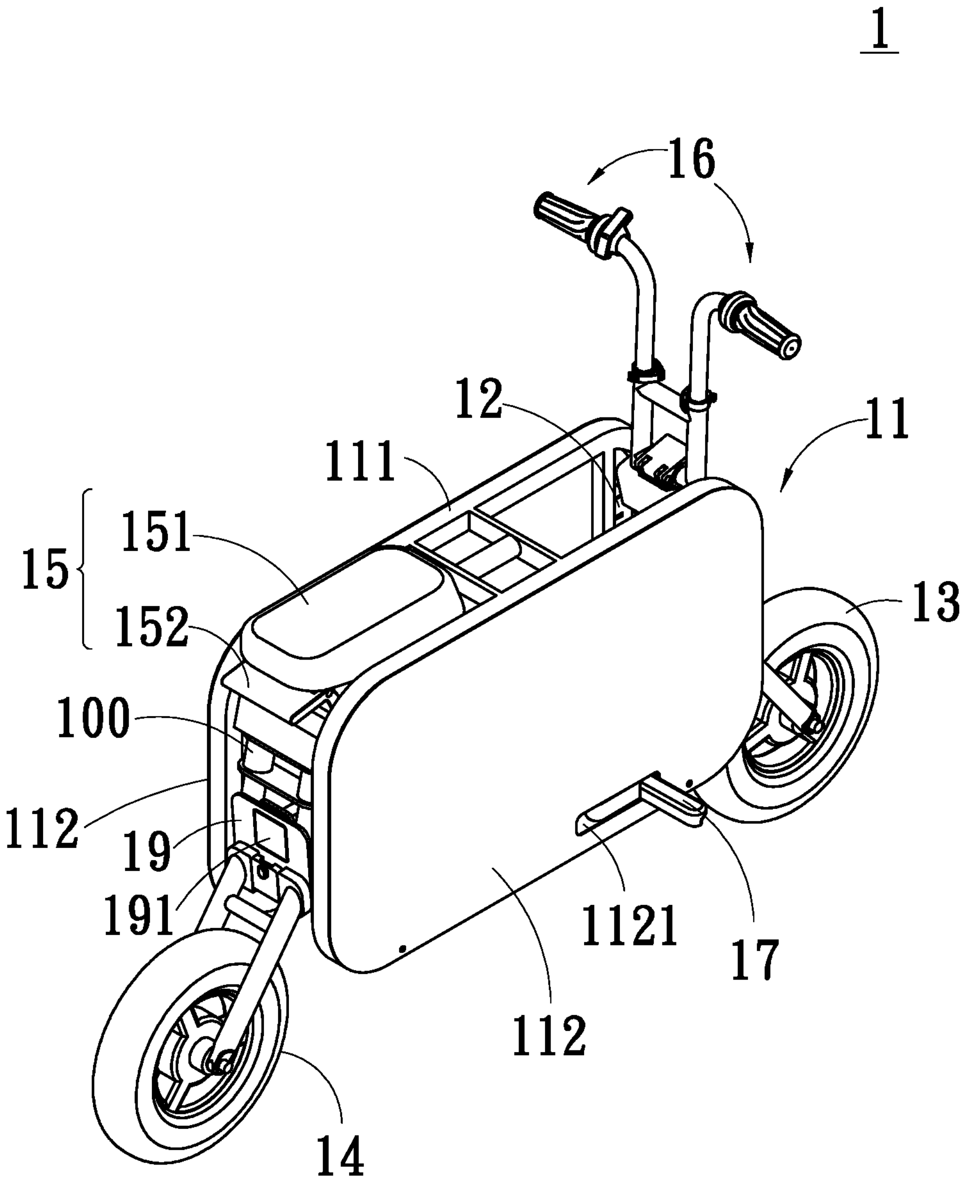
FIG. 2 is a perspective view of a preferred embodiment of the unfolded small electric scooter of the present invention.

Referring to FIGS. 1 and 2, an exploded view and an open perspective view of a preferred embodiment of a small electric scooter of the present invention are respectively illustrated. As shown, a small electric scooter 1 of the present invention includes: a small electric vehicle body 11, at least one mobile power socket 12, a pair of foldable front wheel 13 and rear wheel 14, a seat set 15, a pair of handlebars 16, and a pair of front pedals 17 and a pair of rear pedals 18. The small electric vehicle body 11 includes a rectangular frame 111, a left outer plate 112 and a right outer plate 112 respectively provided on the left and right sides of the rectangular frame 111, a battery compartment 113 provided on each of the two sides of the rectangular frame 111 near the left outer plate 112 and the right outer plate 112, and a battery 114 placed in each of the battery compartments 113. The mobile power socket 12 is installed in the rectangular frame 111 and located in front of the battery compartment 113 on one side thereof and electrically connected to the battery 114 of the battery compartment 113 for use as a mobile power supply. The foldable front wheel 13 and rear wheel 14 are arranged in the rectangular frame 111 at intervals front and rear respectively, and the front wheel 13 and rear wheel 14 are capable of unfolding downwards to the outside of the rectangular frame 111 or being folded to the inside of the rectangular frame 111. The seat set 15 includes a liftable seat 151 and a folding handle 152, wherein the seat 151 is arranged in the rectangular frame 111 near the rear and above the rear wheel 14, wherein the foldable handle 152 is arranged adjacent to the bottom of the seat 151, wherein the rise and fall of the seat 151 is capable of being controlled by pulling the foldable handle 152. The handlebars 16 are arranged in the rectangular frame 111 near the front side, and the pair of handlebars 16 are capable of being folded into the rectangular frame 111 after being rotated and retracted inward. The pair of front pedals 17 and the pair of rear pedals 18 are respectively arranged at the bottom of the rectangular frame 111, and are capable of being unfolded out toward the outside and folded to the inside, wherein the front pedals 17 and the rear pedals 18 are folded and located under the front wheel 13 and the rear wheel 14 for locking the front wheel 13 and the rear wheel 14.

According to a preferred embodiment, the small electric scooter 1 has a shock absorber 100 arranged at each of the front side and the rear side of the rectangular frame 111, wherein the shock absorbers 100 are arranged on the front side and the rear side of the rectangular frame 111 close to the upper position, and are located below the seat set 15, so that the shock absorbers 100 are capable of providing a more stable riding experience for the front wheel 13 and the rear wheel 14. The small electric scooter 1 has a tailgate 19 arranged on the rearmost side of the rectangular frame 11, wherein the tailgate 19 has a rear lamp 191 arranged thereon. The left outer plate 112 and the right outer plate 112, each have a hollow portion 1121 provided therefrom, which corresponds to the front pedals 17, for the front pedals 17 to respectively extend outside the left outer plate 112 and the right outer plate 112.

Figure 3:
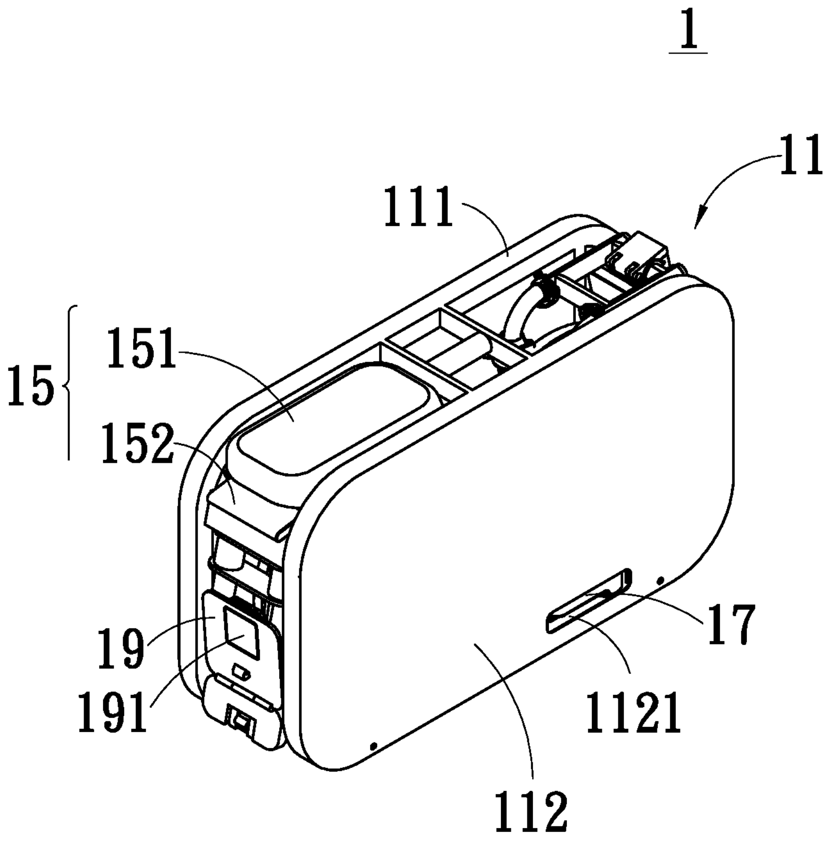
FIG. 3 is a perspective view of a preferred embodiment of the folded small electric scooter of the present invention.
Figure 4:
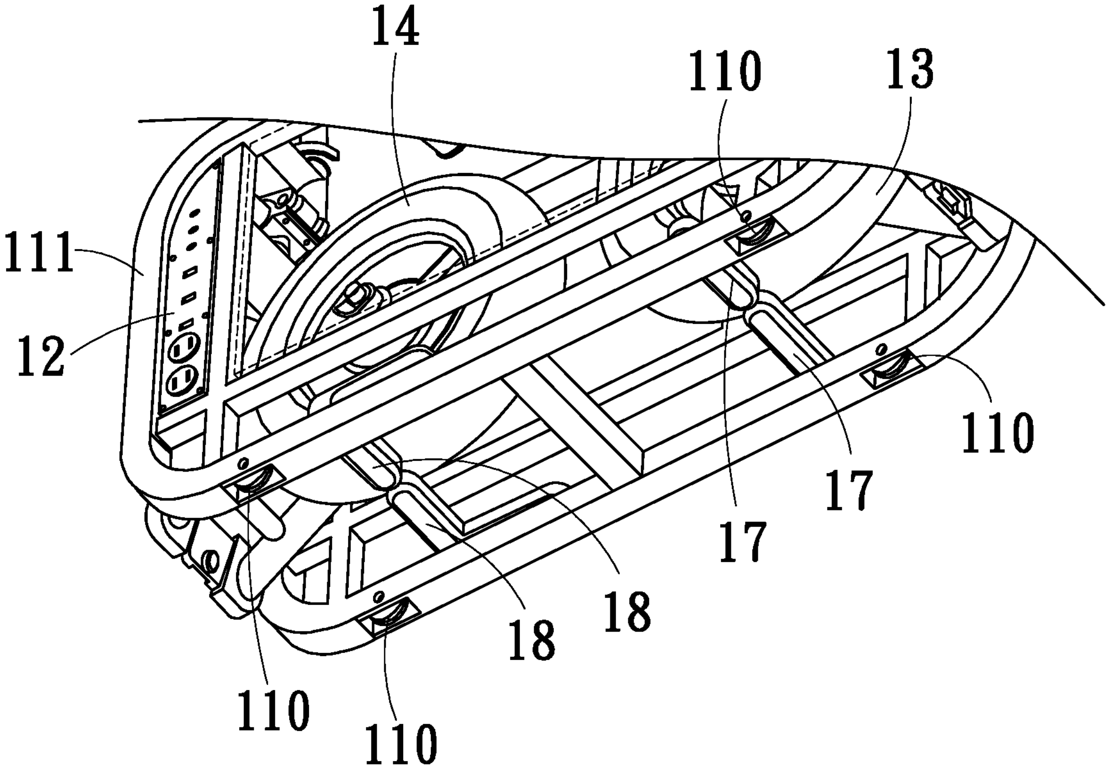
FIG. 4 is a partial perspective view of another viewing angle of a preferred embodiment of the small electric scooter according to the present invention.

Referring to FIGS. 3 and 4, respectively, a perspective view of a preferred embodiment of the present invention of a small electric scooter when folded and a partial perspective view of another viewing angle. As shown in the figure, the pair of foldable front wheel 13 and rear wheel 14, the seat set 15, the pair of handlebars 16, and the pair of front pedals 17 and rear pedals 18 are capable of being folded in a rectangular frame 111, respectively, and the small electric vehicle body 11 forms a cuboid structure after being folded. (as shown in FIG. 3). Moreover, as shown in FIG. 4, the rectangular frame 111 includes small wheels 110 respectively provided on the bottommost two sides thereof, so that after all the preceding components are folded, the small electric vehicle body 11 can directly push the slip through the small wheels 110 at the bottom.

In addition, when the foldable front wheel 13 and rear wheel 14 are folded into the rectangular frame 111, the front pedals 17 and the rear pedals 18 can just abut against the front wheels 13 and the rear wheels 14 after being folded (as shown in FIG. 4), that is, the front wheel 13 and the rear wheel 14 can be more stable after being folded without slipping out of the rectangular frame 111. Pull the folding handle 152 of the seat set 15 to control the rise and fall of the seat 151, wherein the seat 151 is capable of being raised outside the rectangular frame 111 when riding, and the seat 151 is capable of being lowered into the rectangular frame 111 when not in use. When in use, the handlebars 16 on both sides can be fold upwards to extend out of the rectangular frame 111, and then turned outwards to use. When not in use, first turn the handlebars 16 on both sides inward and fold downward, and then can be stored in the rectangular frame 111.

Figure 5:
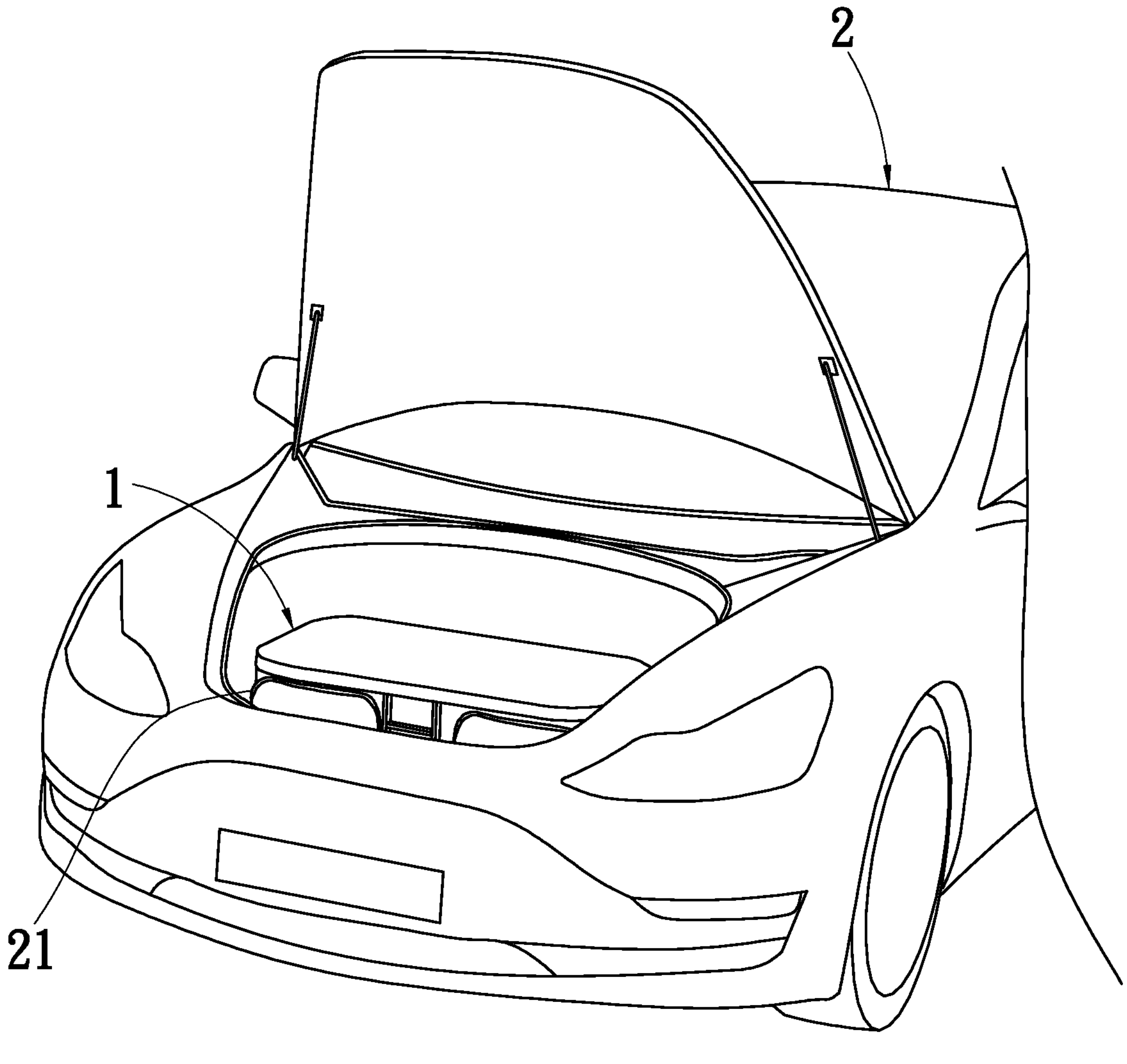
FIG. 5 is a perspective view of the use state of a preferred embodiment of the small electric scooter according to the present invention.

Referring to FIG. 5, the use state view of a preferred embodiment of the small electric scooter of the present invention. As shown in the figure, after the small electric scooter 1 of the present invention is folded, the appearance forms a cuboid structure, which can be directly placed into the storage space 21 in the hood of the electric vehicle 2, thereby satisfying the small storage space 21 of the electric vehicle 2.

As can be seen from the above description, according to the above structure, the battery compartment 113 and the battery 114 are arranged in the rectangular frame 111, and are electrically connected with the mobile power socket 12, so that the small electric scooter 1 itself can provide bidirectional power supply and can also be used as a mobile power supply, which is more convenient to take and store.

Compared with the conventional technology, the small electric scooter of the present invention can be quickly unfolded and folded quickly through the streamlined structural design, and can be stored just in the storage space in the hood of the electric vehicle, and can be ridden and moved when unfolded, and can be used as a mobile power supply, which not only has the advantages of rapid unfolding and folding, but also has the advantages of riding instead of walking and supplying electricity. Therefore, the convenience and practicality of use can be greatly improved.

Although the foregoing description and schematics have revealed the preferred embodiments of the present invention, it must be understood that various additions, many modifications and substitutions may be used in the preferred embodiments of the present invention, and will not depart from the spirit and scope of the principles of the present invention as defined by the attached patent application scope. Those of ordinary skill in the art to which the invention pertains will understand that the invention can be employed with many modifications in form, structure, arrangement, proportion, material, element and assembly. Therefore, the embodiments disclosed in the specification should be regarded as illustrating the present invention rather than limiting the present invention. The scope of the present invention shall be defined by the claims of the appended claims, including their legal equivalents, and not limited by the foregoing description.

What is claimed is:

1. A small electric scooter, configured to be arranged in a storage space in a hood of an electric vehicle, comprising:

a small electric vehicle body, which comprises a rectangular frame, a left outer plate and a right outer plate respectively provided on the left and right sides of the rectangular frame, a battery compartment provided on each of the two sides of the rectangular frame near the left outer plate and the right outer plate, and a battery placed in each of the battery compartments;

at least one mobile power socket, installed in the rectangular frame and located in front of the battery compartment on one side thereof and electrically connected with the battery of the battery compartment for use as a mobile power supply;

a foldable front wheel and a foldable rear wheel, arranged in the rectangular frame at intervals front and rear respectively, wherein the foldable front wheel and the foldable rear wheel are capable of unfolding downwards to the outside of the rectangular frame or being folded to the inside of the rectangular frame;

a seat set, which comprises a liftable seat and a foldable handle, wherein the liftable seat is arranged in the rectangular frame near the rear and above the foldable rear wheel, wherein the foldable handle is arranged adjacent to the bottom of the liftable seat, wherein the rise and fall of the liftable seat is capable of being controlled by pulling the foldable handle;

a pair of handlebars, arranged in the rectangular frame near the front side, wherein the pair of handlebars are capable of being folded into the rectangular frame after being rotated and retracted inward; and a pair of front pedals and a pair of rear pedals, respectively arranged at the bottom of the rectangular frame, which are capable of being unfolded out toward the outside and folded to the inside, wherein the pair of front pedals and the pair of rear pedals are folded and located under the foldable front wheel and the foldable rear wheel for locking the foldable front wheel and the foldable rear wheel.

2. The small electric scooter, as recited in claim 1, wherein the small electric scooter has a shock absorber arranged at each of the front side and the rear side of the rectangular frame, wherein the shock absorbers are arranged on the front side and the rear side of the rectangular frame close to the upper position, and are located below the seat set.

3. The small electric scooter, as recited in claim 1, wherein the small electric scooter has a tailgate arranged on the rearmost side of the rectangular frame, wherein the tailgate has a rear lamp arranged thereon.

4. The small electric scooter, as recited in claim 1, wherein the rectangular frame includes small wheels respectively provided on the bottommost two sides thereof.

5. The small electric scooter, as recited in claim 1, wherein the left outer plate and the right outer plate, each have a hollow portion provided therefrom, which corresponds to the front pedals, for the front pedals to respectively unfold outside the left outer plate and the right outer plate.

6. The small electric scooter, as recited in claim 1, wherein the foldable front wheel and the foldable rear wheel, the seat set, the pair of handlebars, and the pair of front pedals and the pair of rear pedals are capable of being folded in the rectangular frame, respectively, and the small electric vehicle body forms a cuboid structure after being folded.

* * * * *